United States Patent [19]

Take et al.

[11] Patent Number: 5,793,649

[45] Date of Patent: Aug. 11, 1998

[54] APPARATUS FOR MEASURING THE OPERATION OF VEHICULAR ENGINES

[75] Inventors: Shigeo Take; Masao Iwata, both of Yokosuka; Shunsuke Nakamura, Tokyo, all of Japan

[73] Assignee: Kioritz Corporation, Tokyo, Japan

[21] Appl. No.: 755,706

[22] Filed: Nov. 25, 1996

Related U.S. Application Data

[63] Continuation of Ser. No. 549,198, Oct. 27, 1995, abandoned, which is a continuation of Ser. No. 213,610, Mar. 15, 1994, abandoned.

[30] Foreign Application Priority Data

Mar. 17, 1993 [JP] Japan .................. 5-082606

[51] Int. Cl.[6] .............................................. G01B 17/00
[52] U.S. Cl. .............................................. 364/550; 73/116
[58] Field of Search .............................. 364/550, 551.01; 73/116; 327/378, 438, 439

[56] References Cited

U.S. PATENT DOCUMENTS

| 4,694,408 | 9/1987 | Zaleski | 364/551.01 |
|---|---|---|---|
| 4,787,053 | 11/1988 | Moore | 364/550 |
| 4,831,560 | 5/1989 | Zaleski | 364/551.01 |
| 4,989,146 | 1/1991 | Imajo | 364/424.04 |
| 5,050,080 | 9/1991 | Abe | 364/424.04 |
| 5,107,428 | 4/1992 | Bethencourt et al. | 364/424.04 |
| 5,214,582 | 5/1993 | Gray | 364/424.03 |
| 5,245,324 | 9/1993 | Jonker et al. | 345/134 |
| 5,296,869 | 3/1994 | Jonker et al. | 345/24 |
| 5,313,388 | 5/1994 | Cortis | 364/424.04 |
| 5,318,449 | 6/1994 | Schoell et al. | 434/305 |
| 5,325,082 | 6/1994 | Rodriguez | 364/424.03 |
| 5,345,383 | 9/1994 | Vance | 364/424.03 |
| 5,388,045 | 2/1995 | Kamiya et al. | 364/424.04 |
| 5,396,422 | 3/1995 | Forchert et al. | 364/424.03 |
| 5,465,613 | 11/1995 | Takaba et al. | 73/117.3 |

OTHER PUBLICATIONS

Omega Engineering, "Portable Intelligent Datalogger", p. F-87, 1991.

Wolf, "Guide to Electronic Measurements and Laboratory Practice", pp. 106–114, 1983.

*Primary Examiner*—Emanuel Todd Voeltz
*Assistant Examiner*—Patrick Assouad
*Attorney, Agent, or Firm*—Bauer & Schaffer

[57] ABSTRACT

The operation of a machine, varying with time, is sensed and the signals fed to a micro-computer for processing. The processed signals are stored, varying with time. The stored signals are transmitted to an external computer having display means to display the data, the remaining memory capacity and the holding memory of the storage switches are provided to switch mode of storage of the data, transmission of the data or display.

1 Claim, 6 Drawing Sheets

5,793,649

1

APPARATUS FOR MEASURING THE OPERATION OF VEHICULAR ENGINES

This is a Continuation of Ser. No. 08/549,198, filed Oct. 27, 1995, now abandoned, which is a continuation application of Ser. No. 08/213,610, filed Mar. 15, 1994 now abandoned.

BACKGROUND OF THE INVENTION

This invention relates to measuring apparatus for sensing and measuring the operation of motor vehicles and the like and, in particular, to apparatus for detecting variables such as the number of revolutions of an engine with respect to time. Such devcies have utility in vehicles such as a motor bicycle or a four-wheeled vehicle, for example, and industrial machines and equipment where the data must be stored and freely transmitted to an external computer.

Heretofore, sports racing vehicles (e.g. a motorcycle or a four-wheeled automobile) were monitored by a rider or driver. The speed of the vehicle and the number of revolutions of the engine (RPM) were visually or audibly sensed and reported periodically to a mechanic or to other staff members during test driving or actual racing.

Recently, in F-1 racing, a major four-wheeled motor sport, a device utilizing a micro-computer has been provided to transmit by wireless the aforementioned parameters of the vehicle operation. In the pit the transmitted data is processed by a computer such as a personal computer so that monitoring of the vehicle and the engine at real time can be made.

Also, the processing of data from the engines of industrial machines and equipment such as weed cutters and chain saws has become possible at the laboratory level, using large-scale measuring devices and external computers. However, where field testing of a new product is required, monitoring depends on the monitor's intuition since large-scale measuring devices cannot be brought out to the field.

The ordinary measuring devices used for F-1 racing and at the laboratory level are of large-scale and very expensive, and therefore, only race teams sponsored by large manufacturers can be equipped with them. Therefore, a problem arises that other teams with insufficient funds cannot be equipped with such system.

Also, where field testing of agricultural equipment and the like is required, an apparatus allowing for the easy measurement in situ and transmission of the sensed data to the laboratory is desirable.

SUMMARY OF THE INVENTION

The present invention aims at solving the problems of the prior art and, therefore, has as its object the provision of a measuring device capable of displaying and storing variables such as the RPM and the like and further transmitting such data to an external computer with a simplified construction and at reduced cost.

According to the present invention, the apparatus comprises detection means, a micro-computer to process the output signals from the detector relative to time and transmission means, which after processing by said microcomputer, selectively transmits the data stored to an external computer having display means to display said data.

The measuring device is capable of detecting various variables such as the number of revolutions of an engine, processing in the micro-computer the output signals from said detection means, and storing in the storage means and displaying on the displaying means the data all relative to time.

2

Further, the apparatus is capable of transmitting various data stored in the storage means to the external computer through data transmission means in order to process and analyze the various data in the external computer so as to monitor the operational situation of the engine and the like in real time.

Preferably, the measuring device is further provided with mode switching means to select either the mode to display and store the data or the mode to transmit the stored data to the external computer so that the remaining memory capacity of the storage means is displayed on the display means when the mode switching means is set at the data storing mode. On the other hand, the data transmission is started when a data transmission start switch is on while said mode switching means is being set at the data transmission mode, allowing transmission of said data to the external computer.

The measuring device is capable of displaying the remaining memory capacity (the remaining memory holding time) of the storage means on the display means when the display and storing mode of various measured data is selected by the mode switching means. The various measured data stored in said storage means is transmitted to the external computer when the data transmission start switch is turned on, even while said mode switching means is being selected.

DETAILED DESCRIPTION OF THE PREFERRED EMBODIMENT

Figure 1:
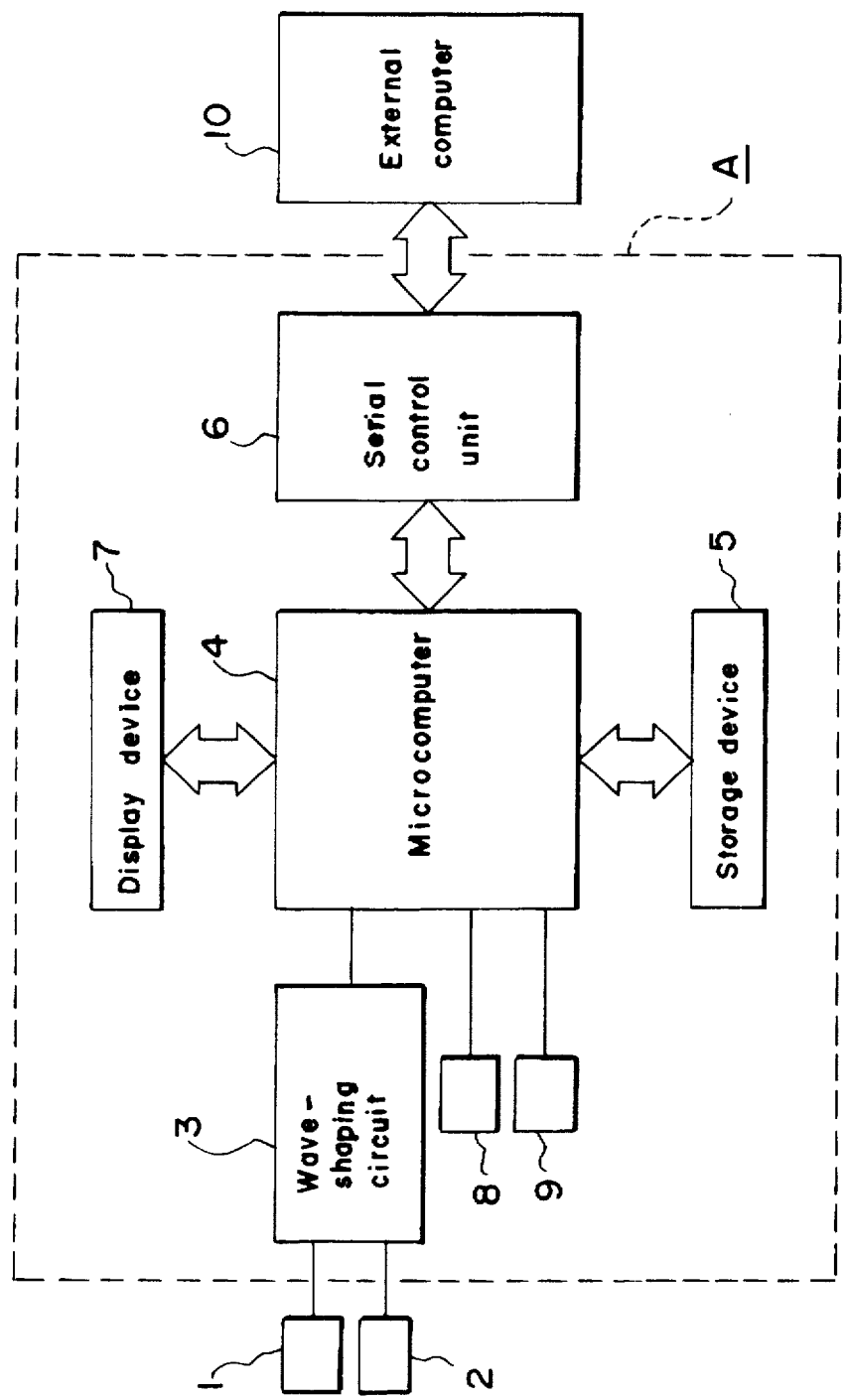
FIG. 1 is a block diagram showing an engine data measuring device according to one embodiment of the present invention.
Figure 2:
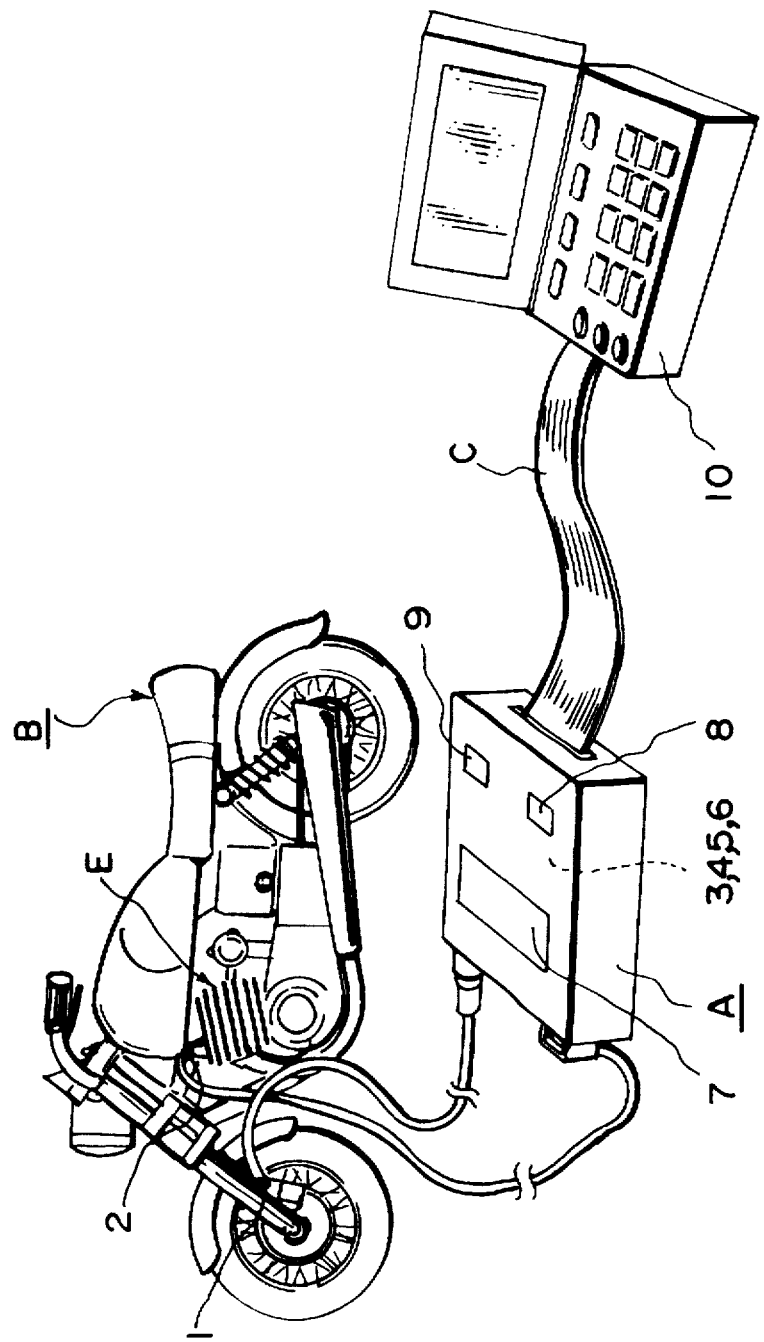
FIG. 2 is a perspective viewing showing a motor bicycle equipped with the engine data measuring device shown in FIG. 1.
Figure 3:
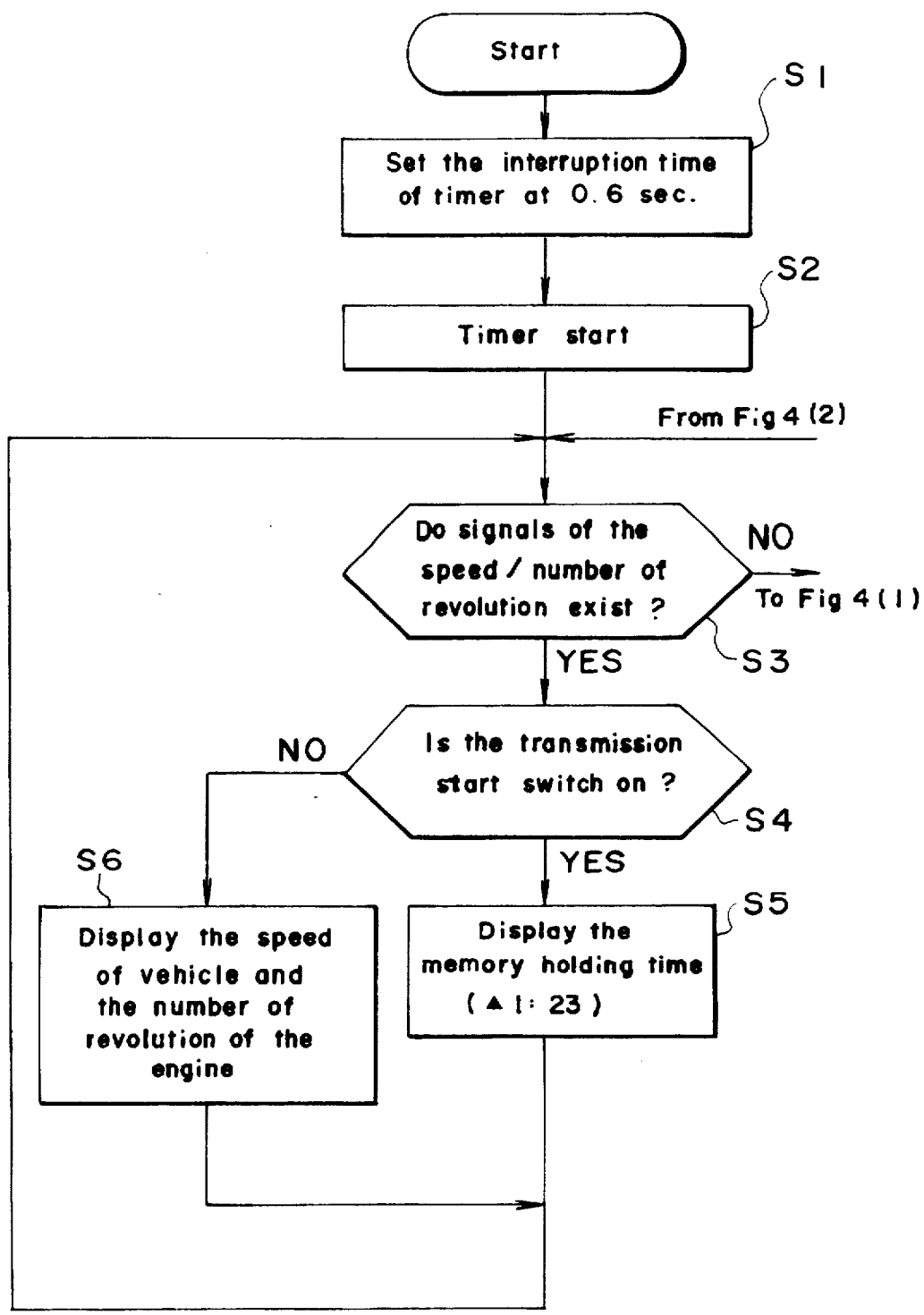
FIG. 3 is a flow chart showing the procedure for storing, display and transmission of the data on the speed of a vehicle and the number of revolutions of an engine measured by the measuring device according to an embodiment of the present invention.

In FIGS. 1–3, A is an engine data measuring device having a speed sensor 1 and a revolution detecting sensor 2 for an engine E, appropriately connected to a motorcycle B, for example.

Where variables such as the speed of the vehicle and the number of revolutions of the engine varying with time within the predetermined interval are to be displayed and stored, the main body of the data measuring device A is, in fact, mounted on an appropriate place of the motorcycle B.

The signals from detectors 1 and 2 are fed to a wave-shaping circuit 3 where the signals are shaped to provide a rectangular wave pulse output signal. A micro-computer 4 is provided capable of processing the variables based on the signals from said wave-shaping circuit 3. The processed data is stored in the storage means 5 of a nonvolatile storage (an electrically read and erasable memory, for example) and displayed on display means 7 (a liquid crystal display, for example).

A serial control unit 6 performs data transmission control when the variables stored in the storage means 5 are transmitted to the external computer 10 (for example, a PC-personal computer) through said micro-computer 4. Such data transmission between the serial control unit 6 and the external computer 10 may be performed through an appropriate connecting cable C.

A mode switch 8, by which either the mode allowing display and storage of data or the mode allowing transmission of data to the external computer 10, is connected to the micro-computer 4 as is a data transmission start switch 9 for directing the performance of transmission start of said data. The mode switch 8 is set at the mode allowing to transmit the data stored in the storage means 5.

Next, the operation of the measuring device according to the present invention will be explained. First, the mode switch 8 is selected to the mode allowing the display and storage of data.

At this time, the holding memory (the cumulative memory holding time) of the storage means 5 is displayed on the display 7 in the absence of signals from the detection means such as the speed sensor 1 and the engine revolution sensor 2. Also in this state, if the data transmission start switch 9 is on, the remaining memory capacity (the remaining memory holding time) is also displayed.

When the signals are entered from each sensor 1 and 2, these signals are input into the wave-shaping circuit 3 and subjected to the waveform shaping process. Based on the thus obtained rectangular wave pulse signals, the micro-computer 4 processes the various data such as the speed of the vehicle and the nubmer of revolutions of the engine varying with time and stores the result in the storage means 5 and simultaneously displays such data on the display 7.

Also, at this time, if the data transmission start switch 9 is turned on, the display 7 shows the remaining memory capacity when no signals are entered from either sensor 1 or 2. Furthermore, if the mode switch 8 is set at the data transmission mode in the absence of signals from the sensor 1 or 2, the holding memory (the cumulative memory holding time) stored before in the storage means 5 is displayed on the display 7 until the data transmission start switch 9 is turned on.

Then, when the data transmission switch 9 is turned on, transmission of various data such as the speed of the vehicle and the number of revolutions of the engine stored in the storage means 5 to the external computer 10 occurs.

This data transmission stops when the micro-computer 4 receives the signal indicating the end of transmission from the external computer 10. Then, the data for each of the speed of the vehicle and the number of revolutions of the engine, consisting of variables varying with time, are processed and analyzed by the external computer 10 in order to periodically monitor the situations of the vehicle.

While no signals are entered from the sensors 1 and 2 at the data transmitting mode, no data transmission occurs even through the data transmission start switch 9 is turned on.

Figure 4:
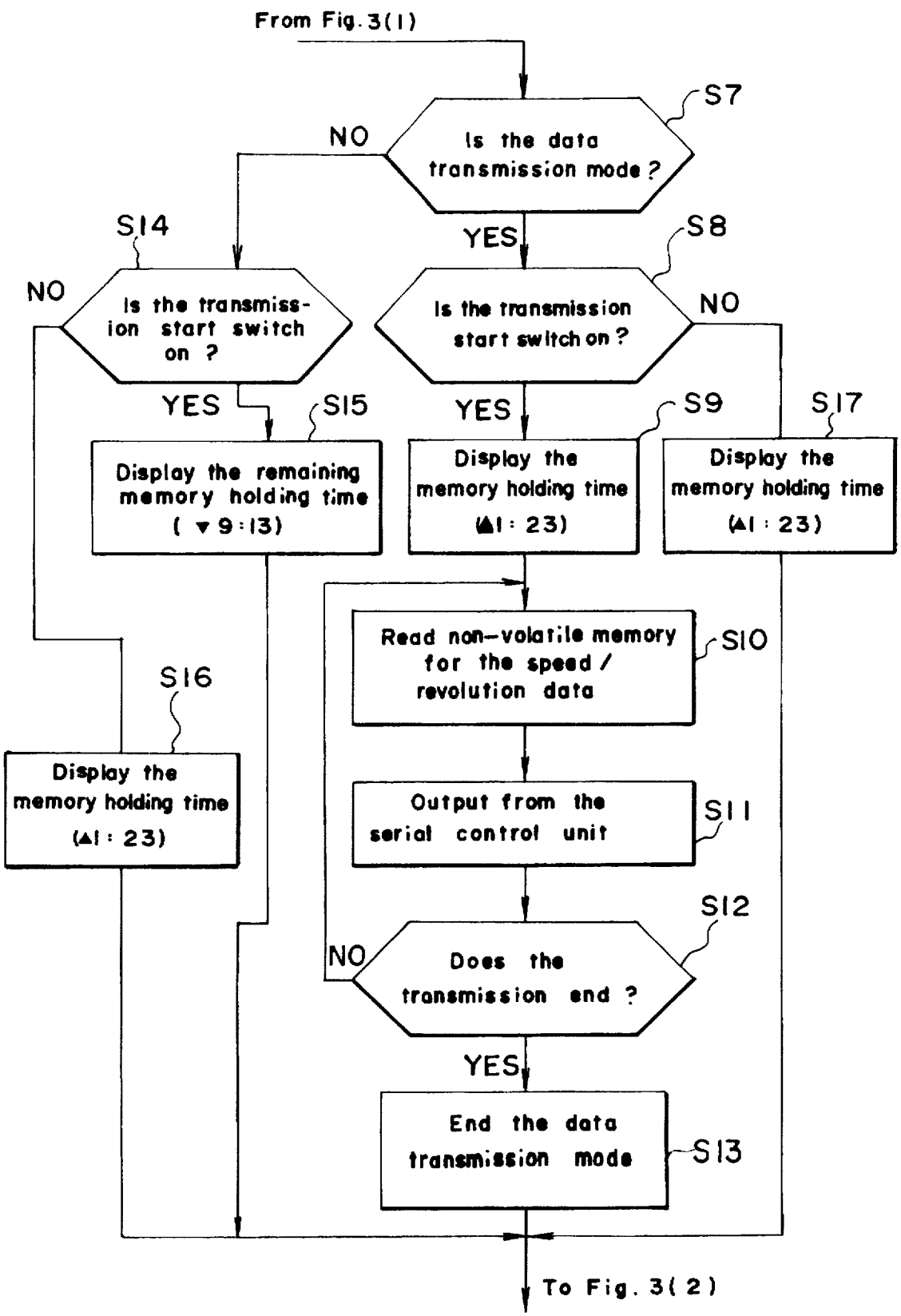
FIG. 4 is also a flow chart showing the remaining part of the procedure for storing, display and transmission of the data corresponding to the speed and the number of revolutions of an engine measured according to the embodiment of the present invention.

Next, the processing operation of the micro-computer 4 is shown in the flow charts of FIGS. 3 and 4. First, at the step S1 of the main flow chart (FIG. 3), the interruption time of an internal timer is set at a selective interval, for example at 0.6 sec.

According to the present invention, because the rectangular wave signals of the speed of the vehicle and the number of revolutions of the engine from the wave-shaping circuit 3 are processed in each interruption routine, each signal is processed by each interruption routine on every occasion when each signal enters into the micro-computer 4.

Then, at step S3 judgement is made as to whether there are inputs from the vehicle speed sensor 1 and the engine revolution sensor 2, and the operation goes to step S4 if yes; otherwise, it goes to step F7 (FIG. 4).

At step S4 judgement is made as to whether the data transmission switch 9 is on, and the holding memory (the cumulative memory holding time) is displayed on the display 7. The process then returns to step S3 if yes; otherwise, the speed of vehicle and the number of revolutions of the engine is displayed on the display 7, and then the process returns to step S3.

If at step S3 the judgement is made that there is no input from each sensor 1 and 2, then judgement is made at step S7 in FIG. 4 as to whether the mode switch 8 is set at the display/storing mode or the transmission mode, and the process goes to the step S8 if the switch 8 was set at the transmission mode, but otherwise goes to the step S14. At step S14 judgement is made as to whether the data transmission start switch 9 is on, and if yes, the remaining memory capacity (the remaining memory holding time) is displayed on the display 7 (step S15), and then the process returns to step S3.

In the meantime, if the data transmission mode is selected at step S7, the next step S8 makes judgement whether the data transmission start switch 9 is on. If not, then the holding memory (the cumulative memory holding time) is displayed on the display means 7 and returns to step S3.

If the data transmission start switch 9 is on at step S9, the holding memory (the cumulative memory holding time) is displayed on the display means 7, and at the same time the step S10 reads the data on the speed of the vehicle and the number of revolutions of the engine as stored in the storage means 5. This data is output at step S11 from the serial control unit 6 to the next step S12 where judgement is made as to whether the data transmission is completed or not.

If the holding memory is zero and the data transmission is completed, the data transmission mode is terminated at step S13, and the process returns to step S3; otherwise, the process returns to step S10 and repeats this routine until the data transmission is completed.

Figure 5:
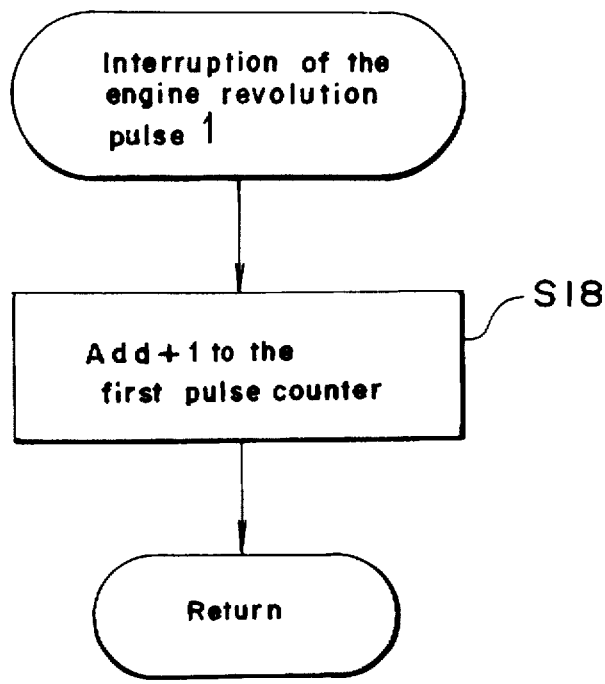
FIG. 5 is a flow chart showing the interruption routine for processing of the number of revolutions of an engine according to the present invention.
Figure 6:
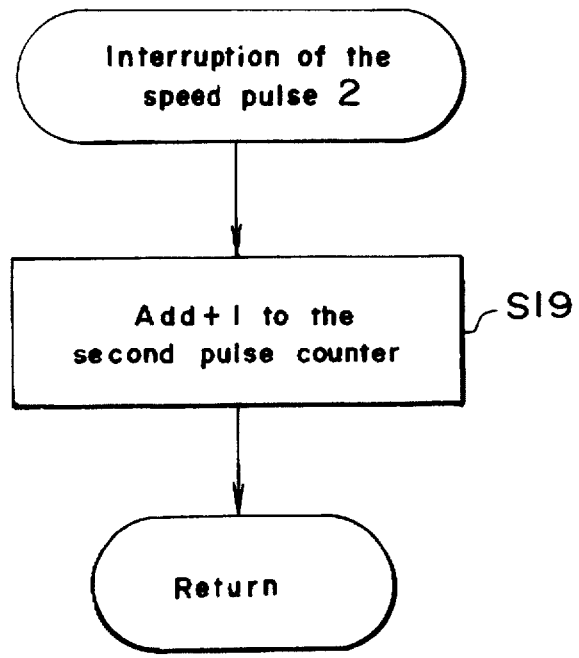
FIG. 6 is a flow chart showing the interruption routine for processing of the speed of a vehicle according to the present invention.

The processing of the speed of the vehicle and the number of revolutions of the engine goes to each interruption routine as shown in FIGS. 5 and 6 every time each pulse signal enters into the micro-computer 4 (except for the case of do-not-interrupt). When processing the number of revolutions of the engine, the first pulse counter adds +1 (step S18) followed by return to end the routine. In case of processing the speed of the vehicle, the second pulse counter adds +1 (step S19) followed by a return to end the routine.

Figure 7:
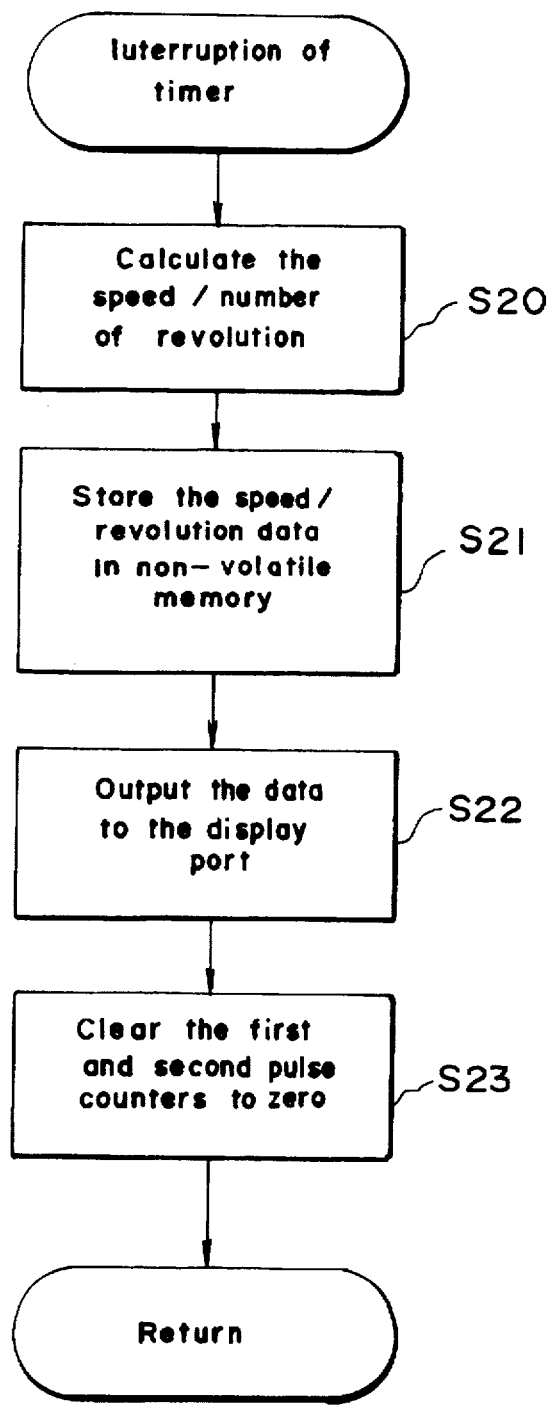
FIG. 7 is a flow chart showing the interruption routine for processing of the internal timer according to the present invention.

On the other hand, in case of internal interruption routine, the process shown in FIG. 7 is performed at every 0.6 sec.—that is, all interruption processes are inhibited and based on either the data counted by the second pulse counter for the speed of vehicle every 0.6 sec. or the data counted by the first pulse counter for the number of revolutions of the engine every 0.6 sec. At step S20, the speed of the vehicle and the number of revolutions of the engine is processed, and then at step S21 the thus calculated data on the speed of the vehicle and the number of revolutions of the engine is stored in the storage means 5.

Further, at step S22, the calculated data on the speed of the vehicle and the number of revolutions of the engine are fed to a display output port and displayed on the display 7 such as a liquid crystal plate. At step S23, each of the first and second pulse counters are cleared to zero, all interruption processes are permitted, and the process goes to return to end the routine.

Even though only the detection of speed of the vehicle and the number of revolutions of the engine are illustrated in this embodiment, it is well known that more detail analysis can be made if various other conditions surrounding the vehicle and the engine such as temperatures of water, suction air and exhaust air as well as the slottle angle and timing of ignition and the like are desired by providing an increasing the number of micro-computers and storage means.

Although the embodiment of the present invention is explained referring to a vehicle used for racing and the like, it is needless to say that the present invention can be applied to analysis of various other data of engines used for industrial machines and equipment such as weed cutters, chain saws, and the like and also to the maintenance thereof by general users.

Further, although the measuring device provided with the speed sensor 1 is shown in the aforementioned embodiment, the speed sensor 1 may be eliminated by integrating the output from the revolution detection sensor 2 of the engine E in order to obtain the speed data, if necessary.

As aforementioned, according to the present invention, a measuring device having detection means detecting variables, a micro-computer processing the output signals, varying with time from said detection means, a storage means storing data, varying with time after having been processed by said micro-computer, and the data transmission means transmitting various data stored in said storage means to an external computer so as to display said data on the display means has several advantages. The measuring device is capable of displaying and storing various variables, varying with time, in a motorcycle or a four-wheeled vehicle and industrial machines and equipment and is also capable of transmitting such data to an external computer so that various conditions surrounding an engine and other machines can be easily recorded and analyzed. Therefore, the present invention has an effect that the measuring device with very simple construction and with low cost can be realized.

According to the present invention, where the measuring device is further provided with the mode switching means to select either the mode displaying and storing the data varying with time or the mode transmitting said stored data to the external computer has other advantages. The remaining memory capacity may be displayed on the display means when the mode switching means is selected to the data storing mode on one hand, and the data transmission starts by the data transmission start switch when the mode switching means is selected to the data transmission mode, allowing transmission of the data to the external computer on other hand. The measuring device is capable of storing or displaying data freely by the mode switching means and transmitting the measured data stored in the storage means to the external computer freely by the operation of the data transmission start switch.

According to the present invention, it is possible to carry out field testing of engines without any limitation, bring back various data stored in the storage means to laboratory and freely process and analyze such data using a large-scale computer and the like installed in laboratory.

What is claimed is:

1. A measuring device for testing the operation of motor vehicles comprising sensing means for continuously detecting operational signals from a vehicle, means for converting the detected signals into a rectangular wave pulse output signal and for feeding said pulse output signals to a micro-computer, a micro-computer for processing the pulse output signals, storage means to store the processed data obtained from said intermittent processing in said micro-computer, data transmission means to transmit said processed data to an external computer, and display means to selectively display said display processed data, amount of storage space used in said storage means, amount of remaining storage space in said storage means, and switching means to select the display on said display means to allow storage of said processed data into said storage means and to initiate data transmission to said external computer only under the condition when said micro-computer is receiving pulse output signals whereby direct transmission of said data to said external computer is allowed.

* * * * *